United States Patent
Iida (10) Patent No.: US 12,409,812 B2
(45) Date of Patent: Sep. 9, 2025

(54) VEHICLE

(71) Applicant: TOYOTA JIDOSHA KABUSHIKI KAISHA, Toyota (JP)

(72) Inventor: Taiki Iida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/233,976

(22) Filed: Aug. 15, 2023

(65) Prior Publication Data

US 2024/0067130 A1     Feb. 29, 2024

(30) Foreign Application Priority Data

Aug. 23, 2022   (JP) ................................. 2022-132649

(51) Int. Cl.
| | | |
|---|---|---|
| *B60S 1/58* | (2006.01) | |
| *B60S 1/02* | (2006.01) | |
| *G06V 20/56* | (2022.01) | |
| *B60S 1/08* | (2006.01) | |

(52) U.S. Cl.
CPC ............... *B60S 1/586* (2013.01); *B60S 1/026* (2013.01); *B60S 1/58* (2013.01); *G06V 20/56* (2022.01); *B60S 1/0818* (2013.01); *B60S 1/0844* (2013.01); *B60S 1/0862* (2013.01)

(58) Field of Classification Search
None
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen et al. | |
| 11,001,255 B2 | 5/2021 | Fukuman et al. | |
| 11,110,937 B2 | 9/2021 | Kinoshita et al. | |
| 2019/0001968 A1 | 1/2019 | Yorifuji et al. | |
| 2019/0210571 A1* | 7/2019 | Ghannam | B60S 1/0818 |

(Continued)

FOREIGN PATENT DOCUMENTS

| | | | |
|---|---|---|---|
| CN | 202382367 U | * | 8/2012 |
| JP | H11-139262 A | | 5/1999 |

(Continued)

OTHER PUBLICATIONS

Translation of CN202382367 (Year: 2012).*
Translation of JP2001088664 (Year: 2001).*

*Primary Examiner* — Peter D Nolan
*Assistant Examiner* — Michael F Whalen
(74) *Attorney, Agent, or Firm* — Dinsmore & Shohl LLP (57) ABSTRACT

A vehicle includes: a front camera configured to capture an image in front of the vehicle through a windshield of the vehicle; a front visibility recognition unit configured to recognize a degree of deterioration of front visibility through the windshield based on captured image of the front camera; a foreign object removing unit configured to remove a surface abnormality of a rear window that deteriorates rear visibility through the rear window of the vehicle; and a rear visibility control unit configured to operate the foreign object removing unit to remove the surface abnormality of the rear window based on the degree of deterioration of the front visibility.

3 Claims, 4 Drawing Sheets

(56) References Cited

U.S. PATENT DOCUMENTS

| | | |
|---|---|---|
| 2019/0344828 A1 | 11/2019 | Omori et al. |
| 2019/0389488 A1 | 12/2019 | Yamada et al. |
| 2021/0206351 A1* | 7/2021 | Pinto .................. H05B 3/84 |

FOREIGN PATENT DOCUMENTS

| | | | | |
|---|---|---|---|---|
| JP | 2001088664 A | * | 4/2001 | |
| JP | 2015-074364 A | | 4/2015 | |
| JP | 2019-001243 A | | 1/2019 | |
| JP | 2019-004254 A | | 1/2019 | |

* cited by examiner

VEHICLE

TECHNICAL FIELD

The present disclosure relates to a vehicle.

CROSS-REFERENCE TO RELATED APPLICATION

This application claims the benefit of priority from Japanese Patent Application No. 2022-132649, filed on Aug. 23, 2022, the entire contents of which are incorporated herein by reference.

BACKGROUND

An imaging device for a vehicle such as that described in Japanese Unexamined Patent Application Publication No. 2019-4254 is known may be configured to control a heater disposed on a rear glass so as to prevent fogging of the rear glass based on an image captured by a camera disposed on the rear glass.

If a dedicated component is additionally provided in order to suppress a deterioration in rear visibility through a rear window, a component cost increases. In the present technical field, it is desired to remove a surface abnormality of the rear window which deteriorates rear visibility through the rear window of the vehicle while suppressing an increase in component cost.

SUMMARY

A vehicle according to one aspect of the present disclosure includes: a front camera configured to capture an image in front of the vehicle through a windshield of the vehicle; a front visibility recognition unit configured to recognize a degree of deterioration of front visibility through the windshield based on captured image of the front camera; a foreign object removing unit configured to remove a surface abnormality of a rear window that deteriorates rear visibility through the rear window of the vehicle; and a rear visibility control unit configured to operate the foreign object removing unit to remove the surface abnormality of the rear window based on the degree of deterioration of the front visibility.

In a vehicle according to an aspect of the present disclosure, a degree of deterioration of front visibility through a windshield is recognized based on a captured image of a front camera. The foreign object removing unit is operated to remove the surface abnormality of the rear window based on the degree of deterioration of the front visibility. As such, utilizing the front camera generally included in the vehicle of the present technology allows an additional component for removing the surface abnormality of the rear window to be omitted. Therefore, according to the vehicle according to one aspect of the present disclosure, it is possible to remove the surface abnormality of the rear window which deteriorates rear visibility through the rear window of the vehicle while suppressing an increase in component cost.

In some examples, the surface abnormality may be fogging or freezing on the surface of the rear window, the foreign object removing unit may be a defogger configured to heat the rear window, and the rear visibility control unit may operate the defogger with a heat generation amount calculated based on the degree of deterioration of the front visibility.

In some examples, the vehicle may further include a vehicle speed acquisition unit configured to acquire a vehicle speed of the vehicle. The rear visibility control unit may operate the defogger at a second heat generation amount that decreases as the vehicle speed increases compared to a first heat generation amount calculated based on the degree of deterioration of the front visibility.

In some examples, the vehicle may further include an occupant information acquisition unit configured to acquire occupant information including riding positions of occupants of the vehicle. When there is an occupant seated in a rear seat of the vehicle, the rear visibility control unit may operate the defogger at a fourth heat generation amount, the fourth heat generation amount being greater than a third heat generation amount calculated based on the degree of deterioration of the front visibility when there is no occupant seated in the rear seat of the vehicle.

According to the vehicle of one aspect of the present disclosure, it is possible to remove the surface abnormality of the rear window which deteriorates rear visibility through the rear window of the vehicle while suppressing an increase in component cost.

DETAILED DESCRIPTION

Hereinafter, embodiments of the present disclosure will be described with reference to the drawings. In the following description, the same or corresponding elements are denoted by the same reference numerals, and redundant description is omitted.

Figure 1:
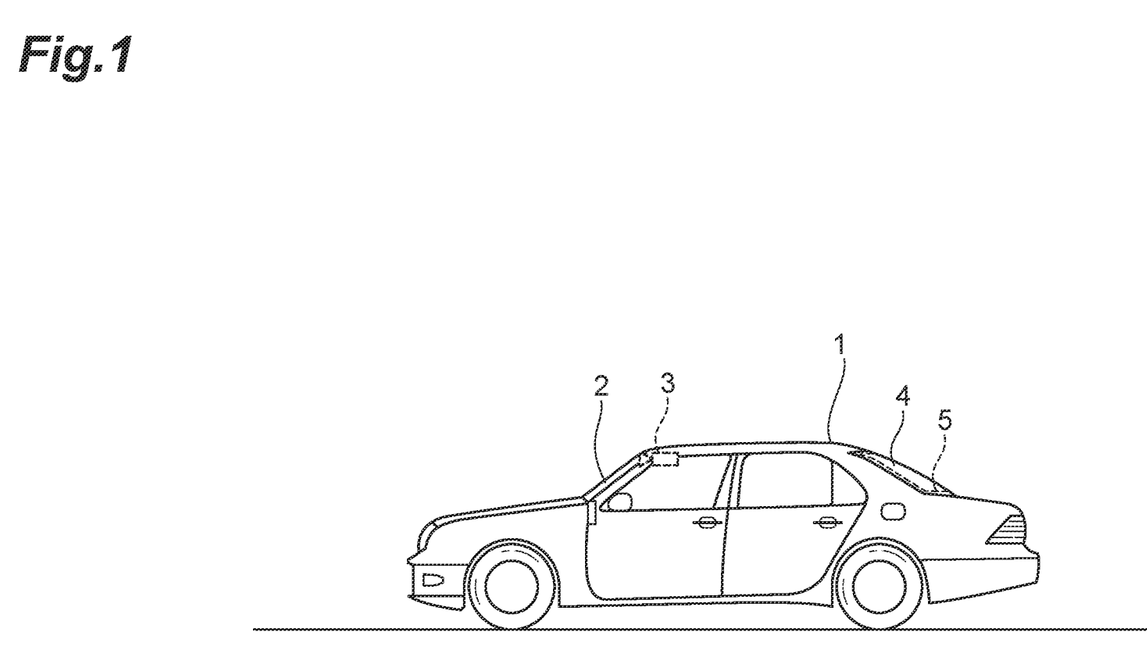
FIG. 1 is a schematic side view of a vehicle according to an embodiment.

FIG. 1 is a schematic side view of a vehicle according to an embodiment. A vehicle 1 shown in FIG. 1 is, for example, a passenger car. The vehicle 1 may be an autonomous driving vehicle. The vehicle 1 comprises a front camera 3 placed inside a windshield 2. The vehicle 1 is equipped with a foreign object removing unit 5 that removes abnormalities on a rear window 4. The abnormality of the rear window 4 refers to a state in which an object reducing a rear visibility through the rear window 4 of the vehicle 1 is attached to the surfaces of the rear window 4. The removal of abnormality means that an object that reduces a rear visibility through the rear window 4 is removed from the rear window 4.

Figure 2:
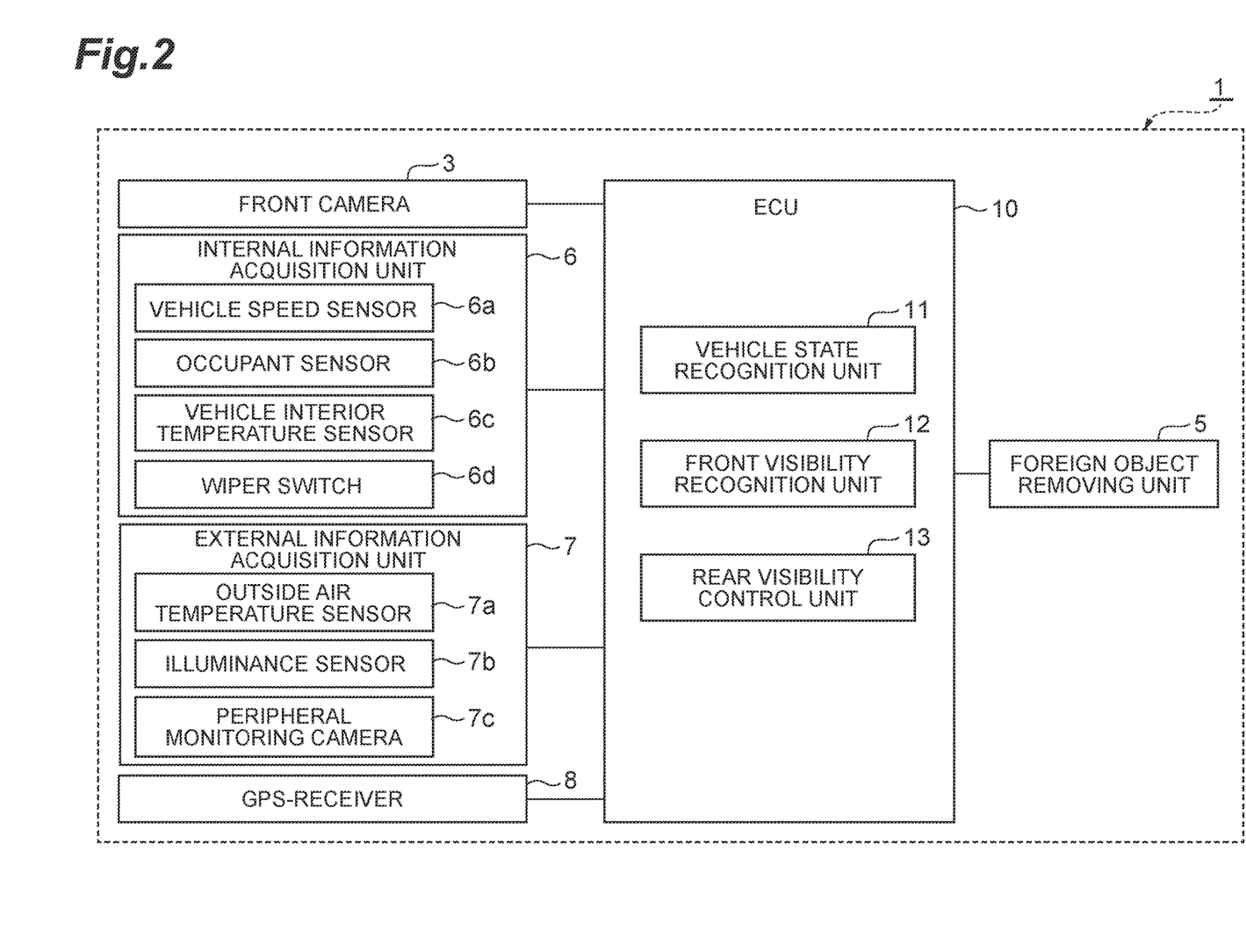
FIG. 2 is a block diagram illustrating a schematic configuration of a vehicle according to an embodiment.

FIG. 2 is a block diagram illustrating a schematic configuration of a vehicle according to an embodiment. As illustrated in FIG. 2, the vehicle 1 uses an electronic control unit (ECU) 10 as an example of a controller that controls the foreign object removing unit 5. The ECU 10 includes a central processing unit (CPU) and a read only memory (ROM), RAM (Random Access Memory). In the ECU 10, various vehicle controls are executed by loading a program stored in the ROM into the RAM and executing the program by the CPU. The ECU 10 may include a plurality of electronic control units.

The ECU 10 is connected to the front camera 3, the foreign object removing unit 5, an internal information acquisition unit 6, an external information acquisition unit 7, and a GPS-receiver 8.

The front camera 3 is a camera for imaging the surrounding environment in front of the vehicle 1. The front camera 3 images the front of the vehicle 1 through the windshield 2. The front camera 3 may be a camera having a ranging function, such as a stereo camera. The front camera 3 may be a monocular camera capable of performing distance measurement of an object in the captured image by performing predetermined image processing on the captured image. The front camera 3 transmits the captured image information to the ECU 10.

The foreign object removing unit 5 is a component that operates to remove surface abnormalities of the rear window 4. The abnormality of the rear window 4 surfaces may be, for example, fogging or freezing of the rear window 4 surfaces. The foreign object removing unit 5 in this case is a component for heating the rear window 4. As the foreign object removing unit 5, for example, a defogger provided in the rear window 4 can be used.

A defogger is a heating device that heats the rear window 4 of the vehicle 1. The defogger may be, for example, a hot wire heater that heats the rear window 4 to eliminate fogging or freezing that may occur in the area of rearward vision through the rear window 4. The defogger is supplied with electric power in response to a control signal from the ECU 10.

The internal information acquisition unit 6 includes a vehicle speed sensor (vehicle speed acquisition unit) 6a, an occupant sensor (occupant information acquisition unit) 6b, a vehicle interior temperature sensor 6c, and a wiper switch 6d.

A vehicle speed sensor 6a is a detector that detects (acquires) the vehicle speed of the vehicle 1. As the vehicle speed sensor 6a, for example, a wheel speed sensor that is provided on a wheel of the vehicle 1 or a drive shaft that rotates integrally with the wheel and that detects the rotation speed of the wheel is used. The vehicle speed sensor 6a transmits the detected vehicle speed information (wheel speed information) to the ECU 10.

A occupant sensor 6b is a detector that acquires occupant information including a riding position of an occupant in the vehicle 1. The occupant sensor 6b may be, for example, a seat belt sensor that is provided in each seat of the vehicle 1 and detects whether or not a seat belt of an occupant is worn. The occupant sensor 6b may be a seating sensor that is provided in each seat of the vehicle 1 and detects pressures of occupants seated in the seats. The occupant sensor 6b may be a vehicle interior camera that captures an image of the vehicle interior. The occupant sensor 6b is acquired as occupant information including a riding position of an occupant seated in each seat of the vehicle 1. The occupant sensor 6b detection result includes information on the riding position of the occupant depending on whether or not the occupant is seated in the seat. The occupant sensor 6b transmits the detected occupant information to the ECU 10.

The vehicle interior temperature sensor 6c is a detector that detects the temperature of the vehicle 1 in the vehicle interior. As the vehicle interior temperature sensor 6c, for example, temperature sensors provided in an on-vehicle air conditioner can be used. The vehicle interior temperature sensor 6c transmits the detected temperature information in the cabin to the ECU 10.

The wiper switch 6d is a detector that detects an operation instruction of a windshield wiper provided in the windshield 2 of the vehicle 1. The wiper switch 6d is provided on, for example, a steering column. The operation instruction of the windshield wiper may include, for example, an intermittent operation instruction, a low-speed continuous operation instruction, and a high-speed continuous operation instruction. The wiper switch 6d transmits the operation instruction information of the detected windshield wiper to the ECU 10.

The external information acquisition unit 7 has an outside air temperature sensor 7a, an illuminance sensor 7b, and a peripheral monitoring camera 7c.

The outside air temperature sensor 7a is a detector that detects the temperature outside the vehicle 1. As the outside air temperature sensor 7a, for example, temperature sensors for controlling an on-vehicle air conditioner can be used. The outside air temperature sensor 7a transmits the detected outside air temperature information to the ECU 10.

The illuminance sensor 7b is a detector that detects the intensity of light received by the vehicle 1. The illuminance sensor 7b is provided, for example, in the vicinity of the windshield 2 in the vehicle 1 vehicle cabin. The illuminance sensor 7b transmits the detected illumination information to the ECU 10.

The peripheral monitoring camera 7c is a camera for imaging a situation in the vicinity of the vehicle 1. The peripheral monitoring camera 7c may be a panoramic view camera installed on a grill of the vehicle 1, a bumper, a door mirror, or the like. The peripheral monitoring camera 7c is used to acquire brightness at least in the vicinity of the vehicle 1 from the captured image. The peripheral monitoring camera 7c transmits the peripheral image information to the ECU 10.

The GPS-receiver 8 receives signals from three or more GPS-satellites to measure the position of the vehicle 1 (e.g., the latitudes and longitudes of the vehicle) and the direction of the vehicle. The GPS-receiver 8 transmits positioning information indicating the measured position and direction of the vehicle 1 on the map to the ECU 10.

Next, the functional configuration of the ECU 10 will be described. ECU 10 has a vehicle state recognition unit 11, a front visibility recognition unit 12, and a rear visibility control unit 13. ECU controls the foreign object removing unit 5 of the rear window 4 based on the captured image of the front camera 3. Some of the functions of the ECU 10 described below may be executed by servers or mobile terminals capable of communicating with the vehicle 1.

The vehicle state recognition unit 11 acquires the vehicle speed of the vehicle 1 based on, for example, the detection result of the vehicle speed sensor 6a. The vehicle state recognition unit 11 acquires occupant information including a riding position of an occupant of the vehicle 1 based on, for example, a detection result of the occupant sensor 6b. The vehicle state recognition unit 11 acquires the temperature in the cabin of the vehicle 1 based on the detection result of the vehicle interior temperature sensor 6c. The vehicle state recognition unit 11 acquires an operation instruction of the windshield wiper based on the detection result of the wiper switch 6d. The vehicle state recognition unit 11 acquires the outside air temperature based on the detection result of the outside air temperature sensor 7a. The vehicle state recognition unit 11 acquires the intensity of light received by the vehicle 1 as illumination based on the detection result of the illuminance sensor 7b. Based on the captured image of the peripheral monitoring camera 7c, the vehicle state recognition unit 11 may obtain the brightness near the vehicle 1 as the illumination intensity. The vehicle state recognition unit 11 acquires the position and direction of the vehicle 1 on the map based on the positioning information of the GPS-receiver 8.

The front visibility recognition unit 12 recognizes a degree of deterioration of the front visibility through the windshield 2 based on the captured image of the front camera 3. The deterioration of the front visibility means a poor visibility state caused by surface abnormality of the windshield 2, with respect to a case in which there is no abnormality of the front visibility through the windshield 2. The surface abnormality on the windshield 2 includes, by way of example, fogging or freezing of the surfaces of windshield 2. The front visibility recognition unit 12 recognizes the degree of fogging or freezing of the surfaces of the windshield 2 that reduces the front visibility through the windshield 2 as the degree of deterioration of the front visibility, for example, by known image processing using a captured image of the front camera 3.

The rear visibility control unit 13 operates the foreign object removing unit 5 to remove abnormalities on the rear window 4 based on the degree of deterioration of the front visibility. The rear window 4 surface abnormality includes, by way of example, fogging or freezing of the rear window 4 surfaces. In view of removing the abnormality of the surfaces of the rear window 4 based on the degree of deterioration of the front visibility, the type of abnormality of the surfaces of the rear window 4 may be the same type as the abnormality of the surfaces of the windshield 2 described above.

As an example, the rear visibility control unit 13 may operate the defogger with a heat generation amount calculated based on the degree of deterioration of the front visibility. The heat generation amount is a command value (hereinafter, simply referred to as "heat generation amount") of the heat generation amount generated by the defogger based on the degree of fogging or freezing of the windshield 2. The rear visibility control unit 13 performs energization control for supplying electric power corresponding to the heat generation amount to the defogger of the rear window 4. Thus, heat is generated by the defogger, and fogging or freezing of the rear window 4 surfaces is eliminated.

The rear visibility control unit 13 may operate the defogger at a second heat generation amount that decreases as the vehicle speed increases compared to a first heat generation amount calculated based on the degree of deterioration of the front visibility. The first heat generation amount means a virtual heat generation amount when it is assumed that fogging or freezing on the windshield 2 corresponding to the degree of deterioration of the front visibility is eliminated by defogger. The second heat generation amount is a heat generation amount for defogger of the rear window 4 calculated using the first heat generation amount. During traveling of the vehicle 1, the rear visibility may be less prone to degradation than the front visibility due to different impact of wind against the traveling vehicle between the windshield 2 and the rear window 4. For example, when the outside air temperature is equal to or lower than the dew point in the vehicle cabin, the windshield 2 is cooled by the wind against the traveling vehicle and is more likely to be foggy than the rear window 4. For example, when the outside air temperature is below freezing, wind against the traveling vehicle will cause the windshield 2 to be cooler and more likely to freeze than the rear window 4. Therefore, the first heat generation amount for eliminating the fog or freezing of the windshield 2 tends to be larger than the second heat generation amount for eliminating the fog or freezing of the rear window 4 as the vehicle speed increases. Therefore, in the rear visibility control unit 13, for example, the second heat generation amount is calculated to be equal to the first heat generation amount when the vehicle 1 is stopped. In the rear visibility control unit 13, as the vehicle speed increases, the second heat generation amount may be calculated as the second heat generation amount when the vehicle 1 stops, and the first heat generation amount may be calculated to be larger than the second heat generation amount when the vehicle 1 stops in accordance with the vehicle speed. In the rear visibility control unit 13, for example, the second heat generation amount may be calculated by subtracting, from the first heat generation amount, a vehicle speed correction amount whose absolute value increases as the vehicle speed increases. The vehicle speed correction amount is a correction amount of the heat generation amount for calculating the second heat generation amount from the first heat generation amount affected by the wind against the traveling vehicle such that the windshield 2 is more likely to be cooled than the rear window 4. The vehicle speed correction amount may be a preset parameter or the like.

The rear visibility control unit 13 may operate the defogger with a fourth heat generation amount when there is an occupant seated in the rear seat of the vehicle 1, the fourth heat generation amount being greater than a third heat generation amount calculated based on the degree of deterioration of the front visibility when there is no occupant seated in the rear seat of the vehicle 1. The third heat generation amount means a virtual heat generation amount when it is assumed that fogging or freezing on the windshield 2 corresponding to the degree of deterioration of the front visibility is eliminated by defogger. The third heat generation amount may be equal to or different from the first heat generation amount. The fourth heat generation amount is a heat generation amount for defogger of the rear window 4 calculated using the third heat generation amount. When there is an occupant in the rear seat, the rear window 4 tends to be foggy more easily due to water vapor contained in the exhaled air of the occupant than when there is no occupant in the rear seat. Therefore, when there is an occupant in the rear seat, the rear visibility control unit 13 may calculate the fourth heat generation amount by adding the occupant correction amount to the third heat generation amount corresponding to no occupant in the rear seat, for example. The occupant correction amount is a correction amount of the heat generation amount for calculating the fourth heat generation amount from the third heat generation amount the fourth heat generation amount being affected by the rear window 4 becoming foggy due to the presence of the occupant in the rear seat, and the third heat generation amount corresponding to the case where the occupant in the rear seat does not exist. The occupant correction amount may be a preset parameter or the like. The occupant correction amount may be set to a larger value as the number of occupants in the rear seat is larger.

When the rear window 4 is exposed to direct sunlight, the rear visibility control unit 13 may reduce the heat generation amount of the defogger of the rear window 4 in response to an increase in the glass surface temperature and a reduction in fogging. For example, when a state in which the illumination intensity is higher than a predetermined illumination threshold continues for a predetermined time, the rear visibility control unit 13 may calculate the heat generation amount to be smaller than when the illumination intensity is equal to or lower than the illumination threshold. Or when a state in which the illumination intensity is higher than the predetermined illumination threshold continues for a predetermined time, the rear visibility control unit 13 may calculate the heat generation amount to be smaller than when a state in which the illumination intensity is higher than the illumination threshold does not continue for a predetermined time. The rear visibility control unit 13 may use, as the illumination intensity, the intensity of light received by the vehicle 1 detected in the illuminance sensor 7b or the brightness around the vehicle 1 detected in the peripheral monitoring camera 7c.

The rear visibility control unit 13 may calculate the heat generation amount according to how the direct sunlight hits the rear window 4 estimated in consideration of the direction in which the sun is located, using the current time and the position and direction of the vehicle 1 on the map based on the positioning information of the GPS-receiver 8. For example, in a time zone in which the sun is located in the east, when the vehicle 1 is oriented in the west direction, the rear visibility control unit 13 may calculate a smaller heat generation amount than when the vehicle 1 is oriented in other directions. For example, in a time zone in which the sun is positioned in the south, when the vehicle 1 is oriented in the north direction, the rear visibility control unit 13 may calculate the heat generation amount smaller than that in a case where the vehicle 1 is oriented in other directions. For example, in a time zone in which the sun is positioned in the west, when the vehicle 1 is oriented in the east direction, the rear visibility control unit 13 may calculate the heat generation amount smaller than that in a case where the vehicle 1 is oriented in other directions.

Incidentally, in a case where an obstruction to the rear window 4 of direct sunlight of the sun is recognized by using a captured image of the peripheral monitoring camera 7c, the rear visibility control unit 13 may not necessarily calculate the heat generation amount to be smaller than that in a case where the illumination intensity is equal to or smaller than the illuminance threshold even if the illumination intensity in the vicinity of the windshield 2 is larger than the illuminance threshold.

The rear visibility control unit 13 may calculate the heat generation amount of the defogger of the rear window 4 to be larger as the outside air temperature is lower in response to the fact that the rear window 4 is more likely to be fogged as the outside air temperature is lower. For example, when the outside air temperature is lower than a predetermined outside air temperature threshold, the rear visibility control unit 13 may calculate the heat generation amount to be larger than when the outside air temperature is equal to or higher than the outside air temperature threshold.

The rear visibility control unit 13 may calculate the heat generation amount of the defogger of the rear window 4 to be larger as the deviation between the outside air temperature and the vehicle interior temperature is larger in correspondence with the fact that the rear window 4 is more likely to be fogged as the deviation between the outside air temperature and the vehicle interior temperature is larger. For example, when the deviation between the outside air temperature and the vehicle interior temperature is greater than a predetermined temperature deviation threshold, the rear visibility control unit 13 may calculate the heat generation amount to be greater than when the deviation is equal to or less than the temperature deviation threshold.

The rear visibility control unit 13 may adjust the heat generation amount of the defogger of the rear window 4 based on the operation instruction of the windshield wiper in response to an increase in the amount of moisture in the air and a tendency of the rear window 4 to become foggy when it rains. For example, when operation instructions of the rear visibility control unit 13 wiper are an intermittent operation instruction, a low-speed continuous operation instruction, and a high-speed continuous operation instruction, respectively, the heat generation amount of the defogger of the rear window 4 may be calculated to increase in this order.

Figure 3:
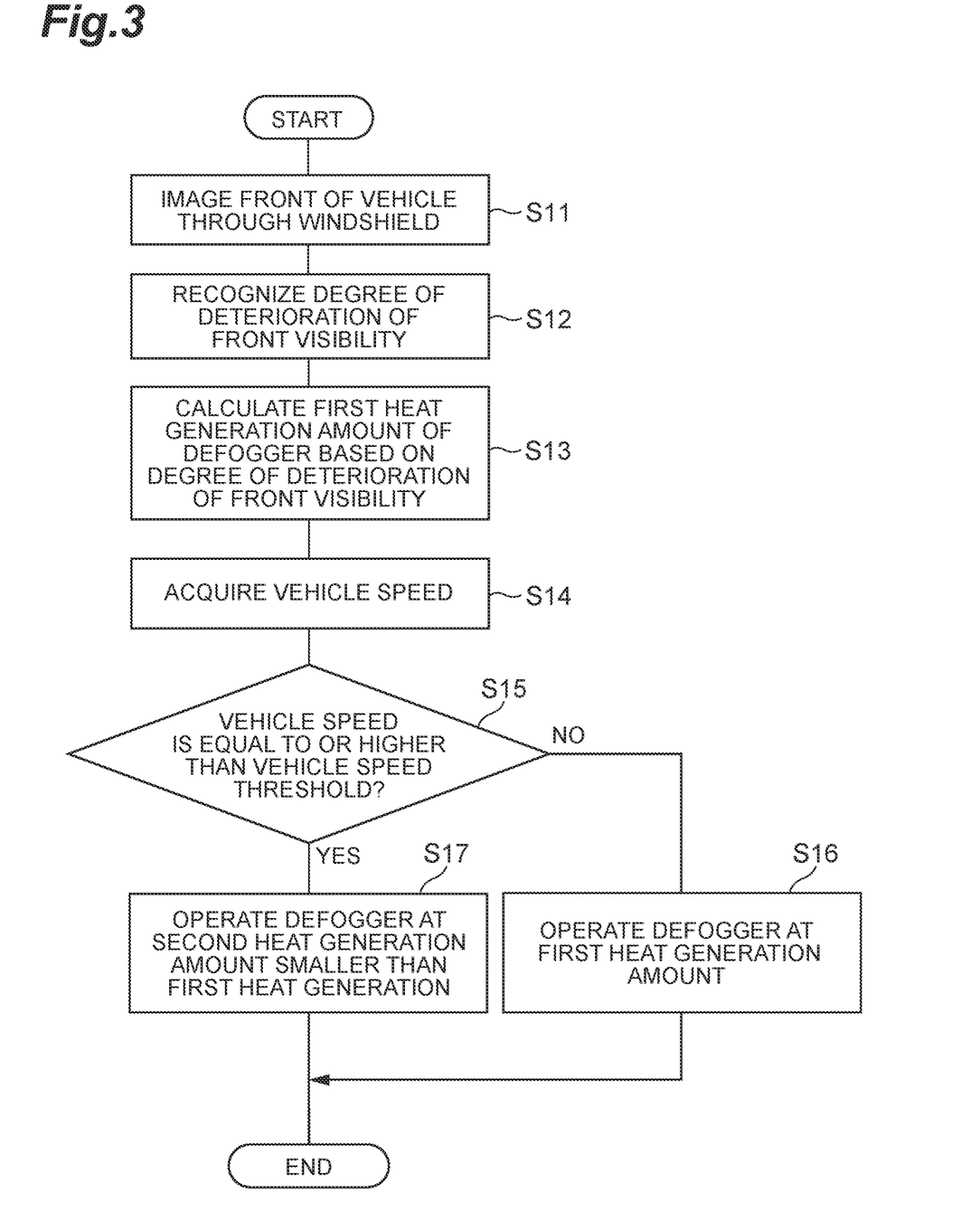
FIG. 3 is a flowchart showing an example of processing performed by the ECU shown in FIG. 2.

Next, an example of processing of the ECU 10 of the vehicle 1 will be described with reference to FIG. 3. FIG. 3 is a flowchart showing an example of processing performed by the ECU 10 shown in FIG. 2. The processing of the flowchart illustrated in FIG. 3 is repeatedly performed in a predetermined period, for example, when the defogger switch is in an on state.

As shown in FIG. 3, in a step S11, the ECU 10 images the front of the vehicle 1 through the windshield 2 with the front visibility recognition unit 12. The front visibility recognition unit 12 continuously or intermittently images in the front camera 3 the surrounding environment in front of the vehicle 1, including, for example, the surfaces of the windshield 2.

In a step S12, the ECU 10 recognizes the degree of deterioration of the front visibility by the front visibility recognition unit 12. The front visibility recognition unit 12 recognizes the degree of fogging or freezing of the surfaces of the windshield 2 that reduces the front visibility through the windshield 2 as a degree of deterioration of the front visibility by known image processing using, for example, captured images of the front camera 3.

In a step S13, the ECU 10 calculates the first heat generation amount of defogger based on the degree of deterioration of the front visibility by the rear visibility control unit 13. The rear visibility control unit 13 calculates the first heat generation amount of the defogger of the rear window 4 as a heat generation amount equal to the heat generation amount set to eliminate the fogging or freezing of the surfaces of the windshield 2, for example, according to the degree of the fogging or freezing of the surfaces of the windshield 2.

In a step S14, the ECU 10 acquires the vehicle speed by the vehicle state recognition unit 11. The vehicle state recognition unit 11 acquires the vehicle speed of the vehicle 1 based on, for example, the detection result of the vehicle speed sensor 6a.

In a step S15, the ECU 10 determines whether or not the vehicle speed is equal to or higher than the vehicle speed threshold by the rear visibility control unit 13. In a case where it is determined that the vehicle speed is not equal to or greater than the vehicle speed threshold (the vehicle speed is less than the vehicle speed threshold) (step S15: NO), the ECU 10 proceeds to a step S16. On the other hand, when it is determined that the vehicle speed is equal to or higher than the vehicle speed threshold (step S15: YES), the ECU 10 proceeds to a step S17.

In the step S16, the ECU 10 operates the defogger at the first heat generation amount by the rear visibility control unit 13. The rear visibility control unit 13 supplies electric power corresponding to a first heat generation amount calculated based on the degree of deterioration of the front visibility to the defogger. Thereafter, the current processing of FIG. 3 is ended.

In the step S17, the ECU 10 operates the defogger at a second heat generation amount smaller than the first heat generation amount by the rear visibility control unit 13. The rear visibility control unit 13 supplies electric power corresponding to the second heat generation amount smaller than the first heat generation amount calculated based on the degree of deterioration of the front visibility to the defogger. In the rear visibility control unit 13, for example, the second heat generation amount may be calculated by subtracting, from the first heat generation amount, a vehicle speed correction amount whose absolute value increases as the vehicle speed increases. That is, the rear visibility control unit 13 operates the defogger at the second heat generation amount which becomes smaller as the vehicle speed becomes faster than the first heat generation amount calculated based on the degree of deterioration of the front visibility. Thereafter, the current processing of FIG. 3 is ended.

As described above, in the vehicle 1, the degree of deterioration of the front visibility through the windshield 2 is recognized based on the captured image of the front camera 3. Based on the degree of deterioration of the front visibility, the foreign object removing unit 5 is operated to remove the surface abnormality of the rear window 4. In this way, by utilizing the front camera 3 generally provided in the vehicle, an additional component for removing the abnormality of the rear window 4 surfaces is not required. By additional component is meant, for example, a rear camera or the like which is exclusively used for recognizing the degree of deterioration of the rear visibility for the elimination of the abnormality of the rear window's 4 surfaces. Therefore, according to the vehicle 1, it is possible to remove the abnormality of the surfaces of the rear window 4 which reduces the rear visibility through the rear window 4 of the vehicle 1 while suppressing the increase of the component cost.

The example of the surface abnormality of the rear window 4 is the fogging or freezing on the surfaces of the rear window 4. The example of the foreign object removing unit 5 is the defogger that heats the rear window 4. The rear visibility control unit 13 operates the defogger with a heat generation amount calculated based on the degree of deterioration of the front visibility. Accordingly, it is possible to remove the fogging or freezing on the rear window 4 while suppressing an increase in additional component cost.

The vehicle 1 further includes the vehicle speed sensor 6a for acquiring the vehicle speed of the vehicle 1. The rear visibility control unit 13 causes the defogger to operate at the second heat generation amount that is smaller as the vehicle speed is higher than the first heat generation amount calculated based on the degree of deterioration of the front visibility. This makes it possible to adjust the heat generation amount of the defogger in accordance with a tendency that the rear visibility is less likely to be deteriorated than the front visibility because the wind against the traveling vehicle hits the windshield 2 and the rear window 4 in a different way.

[Modification]

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

In the process of FIG. 3 described above, the rear visibility control unit 13 adjusts the heat generation amount of the defogger according to the vehicle speed, but in addition to or instead of this, the heat generation amount of the defogger may be adjusted according to occupant information including the riding position of an occupant in the vehicle 1. For example, the ECU 10 may execute the process of the flowchart of FIG. 4 instead of the process of the flowchart of FIG. 3.

Figure 4:
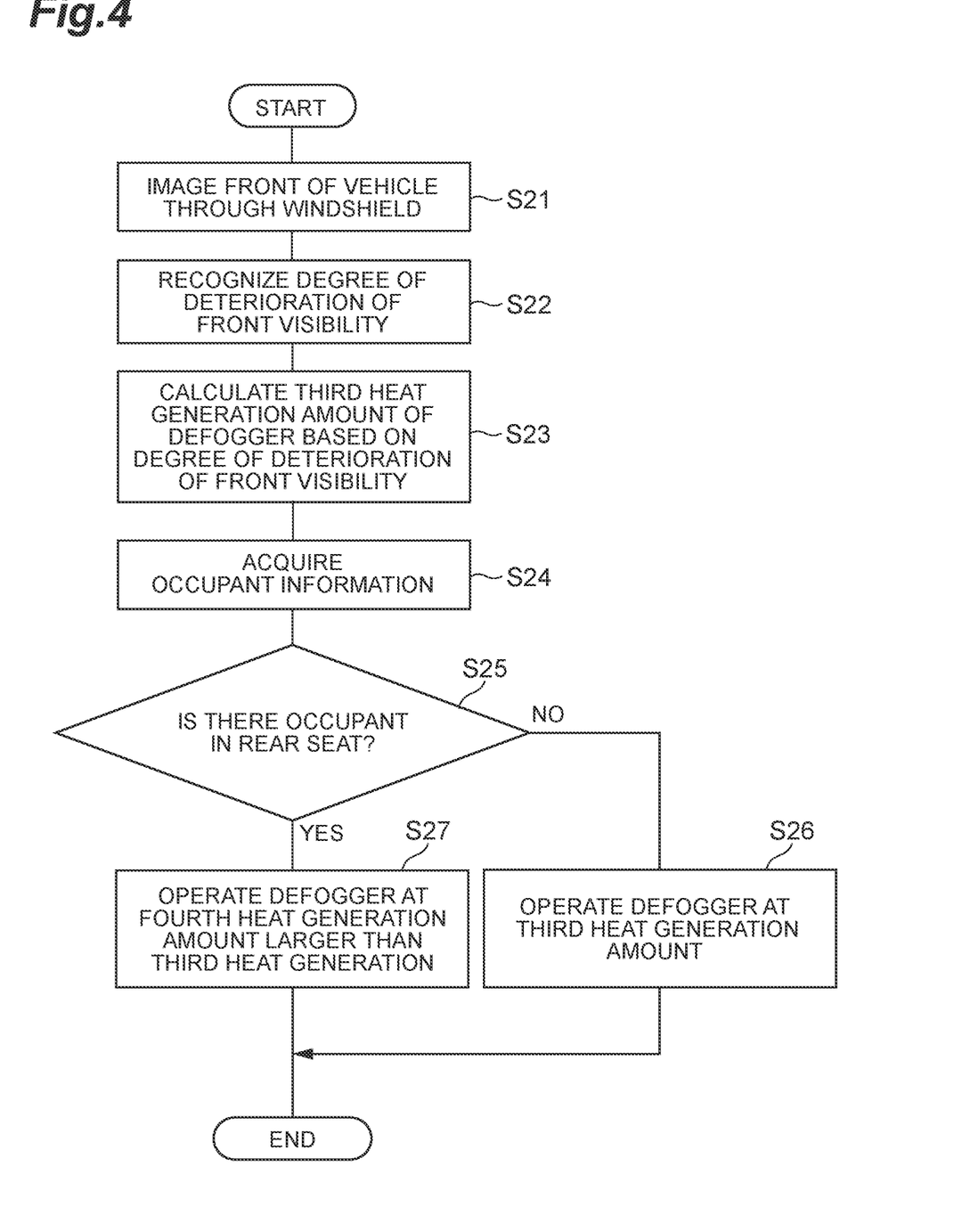
FIG. 4 is a flowchart showing another example of the processing of the ECU shown in FIG. 2.

FIG. 4 is a flowchart showing another example of the processing of the ECU 10 shown in FIG. 2. The processing of the flowchart illustrated in FIG. 4 is repeatedly performed in a predetermined period when the defogger switch is in an on state, for example.

As shown in FIG. 4, in a step S21, the ECU 10 images the front of the vehicle 1 through the windshield 2 with the front visibility recognition unit 12. In a step S22, the ECU 10 recognizes the degree of deterioration of the front visibility by the front visibility recognition unit 12. The step S21 and the step S22 of FIG. 4 may be the same process as the step S11 and the step S12 of FIG. 3.

In a step S23, the ECU 10 calculates the third heat generation amount of defogger based on the degree of deterioration of the front visibility by the rear visibility control unit 13. The third heat generation amount may be equal to the first heat generation amount calculated in the step S13 of FIG. 3.

In a step S24, the ECU 10 acquires occupant information by the vehicle state recognition unit 11. The vehicle state recognition unit 11 acquires occupant information including a riding position of an occupant of the vehicle 1 based on, for example, a detection result of the occupant sensor 6b.

In a step S25, the ECU 10 determines whether or not there is an occupant in the rear seat by the rear visibility control unit 13. When it is determined that there is no occupant in the rear seat (step S25: NO), the ECU 10 proceeds to a step S26. On the other hand, if it is determined that there is an occupant in the rear seat (step S25: YES), the ECU 10 proceeds to a step S27.

In the step S26, the ECU 10 operates the defogger at the third heat generation amount by the rear visibility control unit 13. The rear visibility control unit 13 supplies electric power corresponding to the third heat generation amount calculated based on the degree of deterioration of the front visibility to the defogger. Thereafter, the current processing of FIG. 4 is ended.

In the step S27, the ECU 10 operates the defogger at the fourth heat generation amount larger than the third heat generation amount by the rear visibility control unit 13. The rear visibility control unit 13 supplies electric power corresponding to the fourth heat generation amount larger than the third heat generation amount calculated based on the degree of deterioration of the front visibility to the defogger. That is, when there is an occupant seated in the rear seat of the vehicle 1, the rear visibility control unit 13 operates the defogger with the fourth heat generation amount larger than the third heat generation amount calculated based on the degree of deterioration of the front visibility corresponding to no occupant seated in the rear seat of the vehicle 1. Thereafter, the current processing of FIG. 4 is ended.

The ECU 10 may execute the processes of the step S23 to the step S27 of the flowchart of FIG. 4 in addition to the process of the flowchart of FIG. 3.

As described above, the vehicle 1 further includes the occupant sensor 6b that acquires the occupant information including the riding position of the vehicle 1 occupant. When there is an occupant riding in a rear seat of the vehicle 1, the rear visibility control unit 13 operates the defogger at the fourth heat generation amount larger than the third heat generation amount calculated based on the degree of deterioration of the front visibility corresponding to no occupant riding in a rear seat of the vehicle 1. As a result, the heat generation amount of the defogger can be adjusted in accordance with the tendency that the rear visibility is more likely to be deteriorated than the front visibility due to the presence of an occupant riding in the rear seat close to the rear window 4.

In the above-described embodiment and modification example, the rear visibility control unit 13 performs at least one of the adjustment of the heat generation amount of the defogger according to the vehicle speed and the adjustment of the heat generation amount of the defogger according to the occupant information including the riding position of the occupant in the vehicle 1. However, both of these may be omitted. For example, the ECU 10 may execute the processing of the step S11, S12, S13, and S16 in the flowchart of FIG. 3. In this case, the internal information acquisition unit 6 and the external information acquisition unit 7 of FIG. 2 may be omitted.

In the above-described embodiment and modifications, the foreign object removing unit 5 is a defogger (hot wire heater) provided on the rear window 4, but is not limited to this example. The foreign object removing unit 5 may be a heating device provided in the vicinity of the rear window 4 to indirectly heat the rear window 4. For example, the foreign object removing unit 5 may have a heat source provided apart from the rear window 4, and heat of the foreign object removing unit 5 may be transmitted to the rear window 4 toward the rear window 4 by radiation or hot air using blowing air or the like.

In the above-described embodiments and modifications, the foreign object removing unit 5 removes fogging or freezing as the abnormality of the surfaces of the rear window 4, but is not limited to this example. The abnormality of the surfaces of the rear window 4 may be dirt attached to the surfaces of the rear window 4. The dirt includes, for example, mud dirt, sand dust, and the like. The foreign object removing unit 5 in this case is a component that physically removes dirt from the rear window 4 surfaces and may be, for example, a windshield wiper or a cleaning device.

What is claimed is:

1. A vehicle comprising:
   a front camera configured to capture an image in front of the vehicle through a windshield of the vehicle;
   a front visibility recognition unit configured to recognize a degree of deterioration of front visibility through the windshield based on captured image of the front camera;
   a foreign object removing unit configured to remove a surface abnormality of a rear window that deteriorates rear visibility through the rear window of the vehicle;
   a vehicle speed acquisition unit configured to acquire a vehicle speed of the vehicle; and
   a rear visibility control unit configured to operate the foreign object removing unit to remove the surface abnormality of the rear window based on the degree of deterioration of the front visibility, wherein:
   the surface abnormality is fogging or freezing on a surface of the rear window,
   the foreign object removing unit is a defogger configured to heat the rear window,
   the rear visibility control unit operates the defogger with a heat generation amount calculated based on the degree of deterioration of the front visibility, and
   the rear visibility control unit operates the defogger at a second heat generation amount that decreases as the vehicle speed increases compared to a first heat generation amount calculated based on the degree of deterioration of the front visibility.

2. The vehicle according to claim 1, further comprising an occupant information acquisition unit configured to acquire occupant information including riding positions of occupants of the vehicle, and wherein
   when there is an occupant seated in a rear seat of the vehicle, the rear visibility control unit operates the defogger at a fourth heat generation amount, the fourth heat generation amount being greater than a third heat generation amount calculated based on the degree of deterioration of the front visibility when there is no occupant seated in the rear seat of the vehicle.

3. The vehicle according to claim 1, further comprising an occupant information acquisition unit configured to acquire occupant information including riding positions of occupants of the vehicle, and wherein
   when there is an occupant seated in a rear seat of the vehicle, the rear visibility control unit operates the defogger at a fourth heat generation amount, the fourth heat generation amount being greater than a third heat generation amount calculated based on the degree of deterioration of the front visibility when there is no occupant seated in the rear seat of the vehicle.

* * * * *